(12) United States Patent
Lyon

(10) Patent No.: US 7,628,136 B2
(45) Date of Patent: Dec. 8, 2009

(54) ENGINE CONTROL WITH CYLINDER DEACTIVATION AND VARIABLE VALVE TIMING

(75) Inventor: Kim M. Lyon, Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 11/736,145

(22) Filed: Apr. 17, 2007

(65) Prior Publication Data

US 2008/0257300 A1 Oct. 23, 2008

(51) Int. Cl.
*F02D 13/06* (2006.01)

(52) U.S. Cl. .................................. 123/198 F

(58) Field of Classification Search ............ 123/198 F, 123/90.5, 90.16–90.18, 90.46
See application file for complete search history.

(56) References Cited

U.S. PATENT DOCUMENTS

| 4,111,165 | A | * | 9/1978 | Aoyama et al. | 123/90.15 |
|---|---|---|---|---|---|
| 4,151,817 | A | * | 5/1979 | Mueller | 123/90.16 |
| 4,337,739 | A | * | 7/1982 | Jordan | 123/198 F |
| 4,438,736 | A | * | 3/1984 | Hara et al. | 123/90.16 |
| 4,615,306 | A | * | 10/1986 | Wakeman | 123/90.16 |
| 5,127,375 | A | * | 7/1992 | Bowman et al. | 123/90.12 |
| 6,237,559 | B1 | | 5/2001 | Russ et al. | |
| 6,647,947 | B2 | | 11/2003 | Boyer et al. | |
| 7,013,866 | B1 | | 3/2006 | Prucka et al. | 123/319 |
| 7,021,273 | B1 | | 4/2006 | Prucka et al. | 123/198 F |
| 7,025,035 | B1 | | 4/2006 | Duty et al. | 123/198 F |
| 7,028,661 | B1 | | 4/2006 | Bonne et al. | 123/198 F |
| 7,040,265 | B2 | | 5/2006 | Falkowski et al. | 123/90.16 |
| 7,044,101 | B1 | | 5/2006 | Duty et al. | 123/198 F |
| 7,044,107 | B1 | | 5/2006 | Duty et al. | 123/362 |
| 7,085,647 | B1 | | 8/2006 | Prucka et al. | 701/114 |
| 7,107,828 | B2 | | 9/2006 | Falkowski et al. | 73/114.57 |

* cited by examiner

*Primary Examiner*—Stephen K Cronin
*Assistant Examiner*—Keith Coleman
(74) *Attorney, Agent, or Firm*—Ralph E. Smith

(57) ABSTRACT

A valve control method for an internal combustion engine of a vehicle that uses cylinder deactivation. The method can adjust actuation phases of the engine's valves in an all-cylinder activation mode and a cylinder deactivation mode. The engine's valves may be controlled from an idle operating domain, to a fuel-economy operating domain, and in a cylinder deactivation operating domain.

20 Claims, 2 Drawing Sheets

ENGINE CONTROL WITH CYLINDER DEACTIVATION AND VARIABLE VALVE TIMING

FIELD OF THE INVENTION

The present invention generally relates to controlling engine operation, and more particularly to a valve control strategy for engines having cylinder deactivation and variable valve timing.

BACKGROUND OF THE INVENTION

Internal combustion engines, like reciprocating engines used in automobiles, normally use intake valves to control admission of air or air-fuel-mixture into the engine cylinders, and exhaust valves to let exhaust gases out of the cylinders. Each cylinder commonly has one or more intake valves and one or more exhaust valves. Various systems have been developed for controlling these engine valves to improve fuel economy and performance. For instance, variable valve timing systems can control the opening and closing of the intake and exhaust valves while the engine is operating, and cylinder deactivation systems can turn-off at least some of the engine's cylinders when the vehicle is under certain operating conditions.

SUMMARY OF THE INVENTION

One implementation of a presently preferred method of controlling valves in an internal combustion engine for a vehicle, controls the valves in an all-cylinder activation mode and a cylinder deactivation mode. The method may include selectively advancing each intake valve actuation phase at least about 6 crank angle degrees from a nominal operating domain. The method may also include concurrently selectively retarding each exhaust valve actuation phase at least about 6 crank angle degrees from the nominal operating domain. The method may further include, while in the cylinder deactivation mode, selectively advancing and retarding each active intake valve actuation phase within a range between about 0 to 10 crank angle degrees from the nominal operating domain. Additionally, the method may include, while in the cylinder deactivation mode, concurrently selectively retarding and advancing each active exhaust valve actuation phase within a range between, about 0 to 12 crank angle degrees from the nominal operating domain.

Another implementation of a presently preferred method of controlling valves in an internal combustion engine for a vehicle controls the valves in an all-cylinder activation mode and a cylinder deactivation mode. The method may include, while in the all-cylinder activation mode, selectively advancing each intake valve actuation phase at least about 20 crank angle degrees from an idle operating domain. The method may also include concurrently selectively retarding each exhaust valve actuation phase at least about 20 crank angle degrees from the idle operating domain. The method may further include, while in the cylinder deactivation mode, selectively adjusting each active intake valve actuation phase within a range between about 0 to 20 crank angle degrees toward a cylinder deactivation operating domain. Additionally, the method may include, while in the cylinder deactivation mode, concurrently selectively adjusting each active exhaust valve actuation phase within a range between about 0 to 20 crank angle degrees toward the cylinder deactivation operating domain.

And another implementation of a presently preferred method includes using variable valve tuning to augment a cylinder deactivation mode is an internal combustion engine for a vehicle. The method, may include, when going from an all-cylinder activation mode to the cylinder deactivation mode, retarding each intake valve actuation phase within a range between about 0 to 20 crank angle degrees. The method may also include concurrently advancing each exhaust valve actuation phase within a range between about 0 to 20 crank angle degrees.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 2:
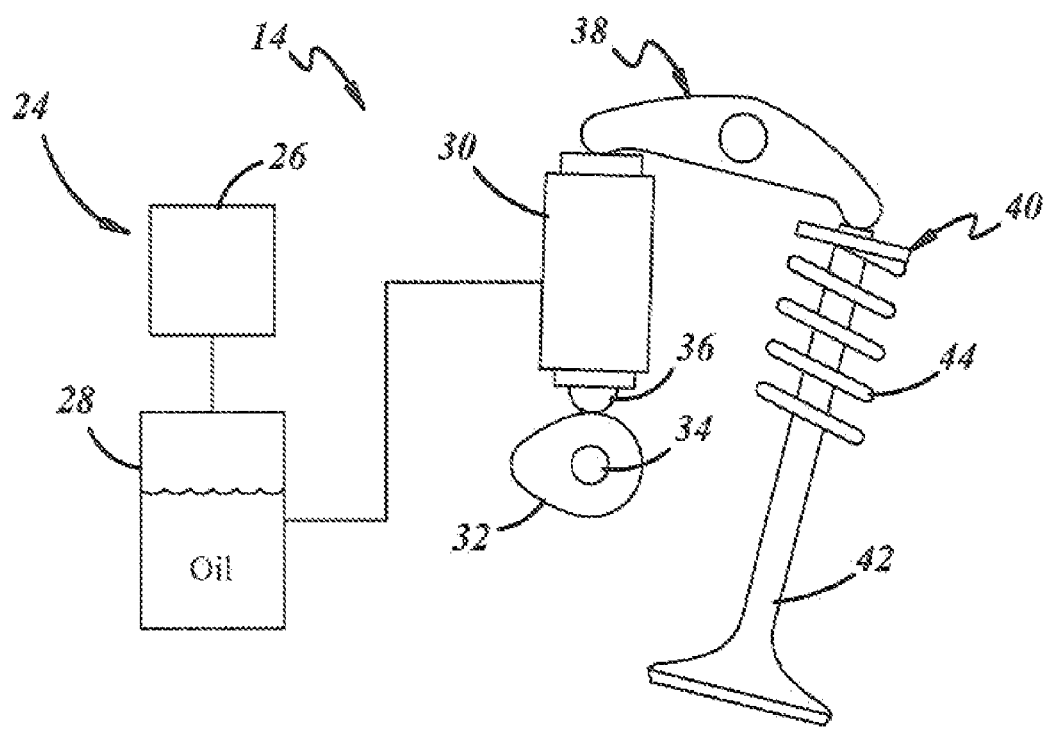
FIG. 2 is a schematic representing an embodiment of a cylinder deactivation system that can be used with the engine control method.
Figure 3:
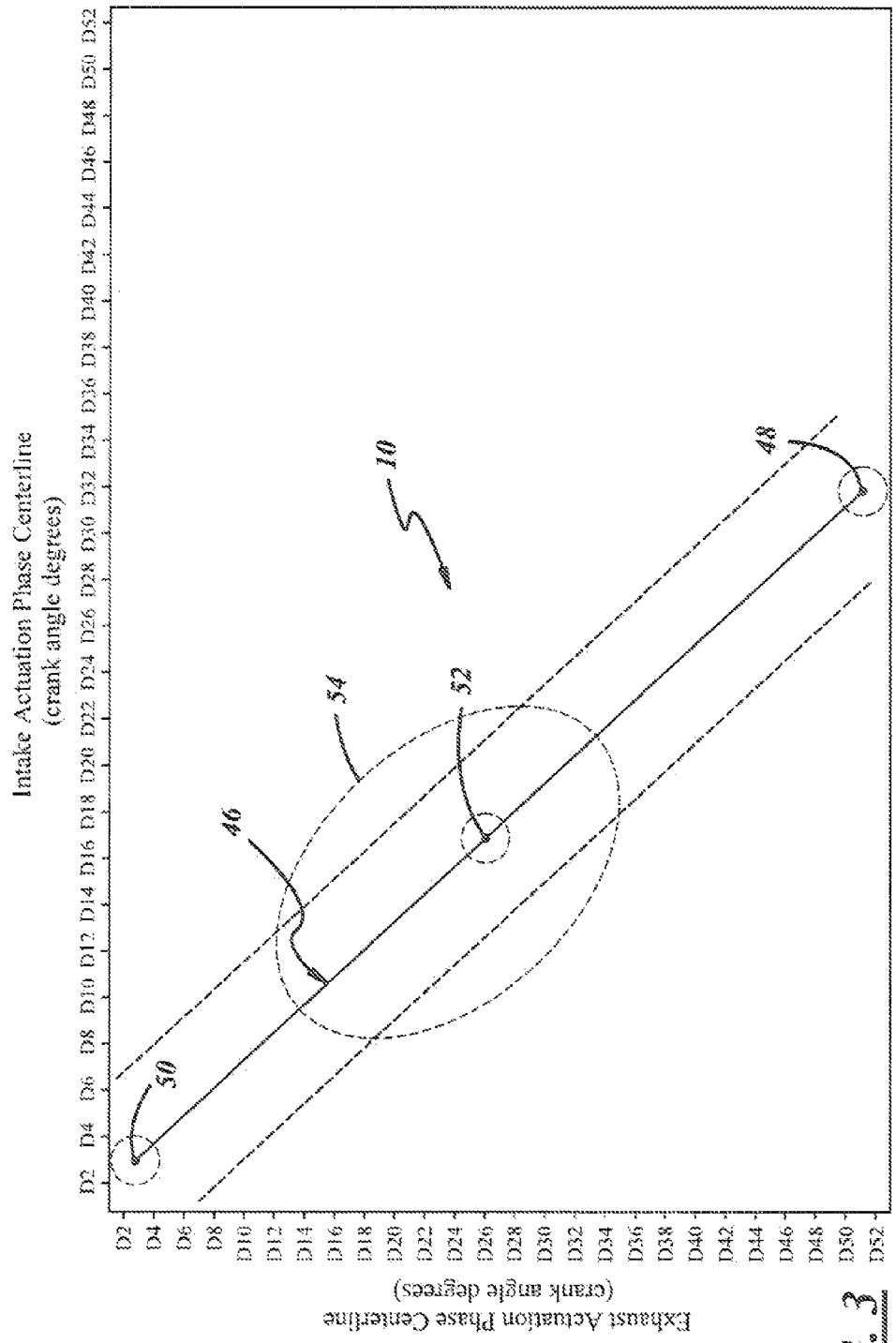
FIG. 3 is a graph depicting an embodiment of the engine control method.

Referring in more detail to the drawings, FIG. 3 shows one embodiment of a valve control strategy, or method 10, that improves fuel economy and performance of an internal combustion engine for an automobile by using variable valve timing to augment cylinder deactivation. In particular, a variable valve timing system 12 (FIG. 1) can be used with a cylinder deactivation system 14 (FIG. 2) to continuously adjust actuation phases of engine valves through an all-cylinder activation mode (where all piston cylinders are being used) and a cylinder deactivation mode (where only some of the piston cylinders are being used, usually half). The method may, among other things, increase cylinder volumetric efficiency and reduce engine-pumping loss, thus improving fuel economy and performance in some engines.

Figure 1:
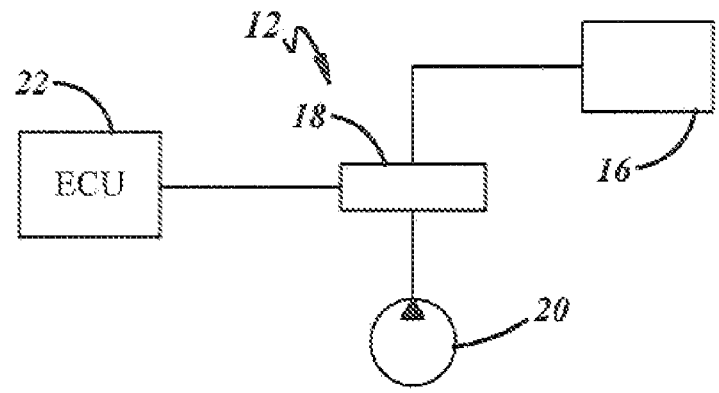
FIG. 1 is a schematic representing an embodiment of a variable valve timing system that can be used with an engine control method for an internal combustion engine.

One embodiment of the valve control method 10 can use the variable valve timing system 12 shown in FIG. 1. Skilled artisans will appreciate that such variable valve timing systems can continuously control intake and exhaust valve actuation (opening and closing) in various ways throughout an engine's operation. For instance, these systems can control event-phasing. Event-phasing describes a way of advancing or retarding a particular valve's actuation phase (duration, measured in crank angle degrees, from when the valve opens to when it closes) with respect to a piston stroke when at top-dead-center (cylinder overlap).

Different variable valve timing systems, including the system 12 or an electric solenoid system (not shown), can be used in the valve control method 10 regardless of whether or not the systems also control valve actuation duration, valve lift, or both. The exact type of variable valve timing system used can depend on the type of engine, the type of valve train, and the like. In the exemplary embodiment shown, the variable valve timing system 12 independently controls an intake valve's actuation phase distinct from an exhaust valve's actuation phase, meaning that the variable valve timing system can adjust one and not the other. The system 12 can include, among other components, a vane-type variable valve timing mechanism 16 that can be partly controlled by a solenoid type electromagnetic actuator 18, a hydraulic circuit (not shown)

with a pump 20 for pumping oil in and out of the mechanism 16, and an ECU 22 for controlling the actuator 18. Skilled artisans will know the general construction, arrangement, and operation of these types of variable valve timing systems and thus a more complete description will not be given here.

The cylinder deactivation system 14 shown in FIG. 2 can also be used in one embodiment of the valve control method 10. Skilled artisans will appreciate that such cylinder deactivation systems deactivate, or turn-off, some of the engine's cylinders (usually half) when the vehicle encounters pre-determined operating conditions such as light-to-moderate load conditions when the vehicle is cruising. For instance, some intake and exhaust valves that are used during the all-cylinder activation mode can remain closed and thus not used during the cylinder deactivation mode. These valves can then be instantly activated, or turned-on, once the vehicle comes out of the pre-determined operating condition.

Different cylinder deactivation systems, including the system 14, can be used in the valve control method 10. The exact type of cylinder deactivation system can depend on the type of engine, the type of valve train, and the like. In fact, in some cases a separate cylinder deactivation system may not be needed and thus not used altogether. For instance, some electric solenoid, electric hydraulic, or purely mechanical variable valve limiting systems can be used to deactivate cylinders in addition to controlling the various valve actuation parameters. Even so, the cylinder deactivation system 14 can be used as a separate system with the variable valve timing system 12. The system 14 can turn-off some of an engine's cylinders with, among other components, an electro-hydraulic manifold assembly 24 that can include at least one solenoid valve 26 and an oil pressure assembly 28 that together control the flow of oil in and out of a hydraulic roller follower 30. The hydraulic roller follower 30 can house a valve deactivator assembly (not shown) and, at one end, contacts a cam 32 on a camshaft 34 with a roller follower 36. At another end, the hydraulic roller follower 30 can be operatively connected to a rocker arm assembly 38 that can in turn be operatively connected to a valve assembly 40 shown with a valve 42 and a spring 44. Skilled artisans will know the general construction, arrangement, and operation of these types of cylinder deactivation systems and thus a more complete description will not be given here.

FIG. 3 shows a graph depicting the valve control method 10 that can be used with the variable valve timing system 12 and the cylinder deactivation system 14. The valve control method 10 can be used with different internal combustion engines and thus the exact values ($D_2$, $D_4$, $D_6$, ... $D_{52}$) along each axis will vary accordingly and can depend on the type of engine, the type of valve train, and the like. The horizontal axis generally gives the position, in crank angle degrees, of the intake valve actuation phase centerline (peak of intake valve lift) in relation to its respective piston when that piston is at top-dead-center (cylinder overlap). In other words, the horizontal axis generally gives the position of the centerline of an open and close phase of the particular intake valves during an intake stroke of the piston. One end of the horizontal axis, $D_{52}$, represents a fully retarded position of the particular intake center line; while the other end of the horizontal axis, $D_2$, represents a fully advanced position. Therefore, when the intake centerline position goes from right to left along this axis it is advancing, and conversely from left to right it is retarding. The vertical axis, on the other hand, generally gives the position, in crank angle degrees, of the exhaust valve actuation phase centerline (peak of exhaust valve lift) in relation to its respective piston when that piston is at top-dead-center (cylinder overlap). In other words, the vertical axis generally gives the position of the centerline of an open and close phase of the particular exhaust valves during an exhaust stroke of the piston. One end of the vertical axis, $D_{52}$, represents a fully advanced position of the particular exhaust centerline; while the other end of the vertical axis, $D_2$, represents a fully retarded position. So here, when the exhaust centerline position goes from bottom to top along this axis it is retarding, and conversely from top to bottom it is advancing.

Still referring to the graph, one embodiment of a valve event overlap line 46—as determined by an algorithmic control scheme—generally shows the positions of both the intake and exhaust valve actuation phase centerlines for an exemplary internal combustion engine throughout an engine's operation. The exemplary internal combustion engine's valves will operate, and continuously adjust along the overlap line 46 according to throttle, speed, required torque, and other factors. Skilled artisans will appreciate that overlap lines for different internal combustion engines can differ. For example, other overlap lines may have different lengths, positions, and slopes. The phantom parallel lines on each side of the overlap line 46 partly contemplates these differences and denoted that these other overlap lines are still within the scope of the valve control method 10. In one embodiment, the overlap line 46 can have a −1 slope according to how the respective valve actuation phase centerlines are plotted on the graph; meaning that for every 1 crank angle degree, the intake actuation phase centerline is advanced, the exhaust phase centerline is retarded an equivalent 1 crank angle degree, and vice versa. This relationship creates a valve overlap angle that is relatively constant and thus remains substantially the same throughout the engine's valves operating set points. This relationship also means that for every 1 unit of measurement that a blow down volume is decreased, an intake valve closing volume is decreased an equivalent 1 unit of measurement, and vice versa. In one sense, this relationship creates symmetry about the overlap angle with respect to the intake and exhaust valve actuation phase centerlines. Skilled artisans will know that a large blow down volume and a large intake valve closing volume can have an adverse effect on engine performance and fuel economy. In other embodiments, overlap lines within the valve control method 10 can have a negatively sloped line when the intake and exhaust valve actuation phase centerlines are plotted as such. Consequently, various positions on the overlap line 46 can differ from engine-to-engine including an idle operating setpoint or domain 48, a fuel-economy operating setpoint or domain 50, and a nominal operating setpoint or domain 52. The phantom circles around these setpoints partly contemplate the differences.

The idle operating domain 48 represents the approximate respective valve centerline positions when the particular engine is idling (a.k.a., default centerline, or the starting position of a lock-pin of a variable valve timing system if that system indeed has such a lock-pin). The fuel-economy operating domain 50 represents the approximate respective centerline positions when the particular engine is getting improved fuel-economy performance with respect to other positions while the engine is using variable valve timing in the all-cylinder activation mode. And the nominal operating domain 52 represents the approximate respective centerline positions if the particular, engine did not have variable valve timing and instead the engine's valves were fixed (a.k.a., fixed cam design). Skilled artisans will know that the nominal operating position for different engines is principled on a compromise between getting maximum horsepower out of the engine and maintaining idle combustion stability, and may also depend on, among other things, cam shaft lobe profiles.

A cylinder deactivation operating domain 54, on the other hand, represents the approximate range of respective valve centerline positions when the particular engine is operating in the cylinder deactivation mode. The phantom shape denotes its approximate varying range from engine-to-engine. In the cylinder deactivation operating domain 54, the engine is getting improved torque performance with respect to other positions. This improved torque replaces the lost torque that may result when deactivating some of the engine's cylinders. This way the engine can operate in the cylinder deactivation operating domain 54 as long as possible, have a greater selection of engine operating set points, and receive the associated, improved fuel-economy performance.

In the valve control method 10, the exemplary internal combustion engine idles, or starts, at the idle operating domain 48. Assuming that each D value along the axes is one degree of crank angle, such that D2 equals two degrees, D4 equals four degrees, and so on; then this exemplary intake actuation phase centerline advances a total of at least about 20 crank angle degrees from the idle operating domain 48 to the fuel-economy operating domain 50, and more suitably a total of about 30 degrees in the all-cylinder activation mode. At the same time, the exemplary exhaust actuation phase centerline retards a total of at least about 20 crank angle degrees from the idle operating domain 48 to the fuel-economy operating domain 50, and more suitably a total, of about 50 degrees in the all-cylinder activation mode. Also, from the idle operating domain 48 to the nominal operating domain 52, the intake actuation phase centerline advances a total of about 14 crank, angle degrees and the exhaust actuation phase centerline retards a total of about 24 crank angle degrees—both in the all-cylinder activation mode. Furthermore, from the nominal operating domain 52 to the fuel-economy operating domain 50, the intake actuation phase centerline advances at least about 6 crank angle degrees or between a range of about 0 to 24 crank angle degrees, and more suitably at least about 8 crank angle degrees, or between a range of about 0 to 14 degrees in the all-cylinder activation mode. At the same time, the exhaust actuation phase centerline retards at least about 6 crank angle degrees or between a range of about 0 to 24 crank angle degrees, and more suitably at least about 8 crank angle degrees or between a range of about 0 to 14 degrees in the all-cylinder activation mode.

Skilled artisans will appreciate that the above description of totals and ranges does not necessarily mean that the valves only respectively advance or retard, but rather the valves can both advance and retard within a particular total or range. For example, the intake actuation phase centerline continuously adjusts (advances and retards) within the total of the 20 degrees from the idle operating domain 48 to the fuel-economy operating domain 50 depending on engine throttle, speed, required torque, intake and exhaust system design, engine design parameters, and other factors. This holds true for all totals and ranges described for the valve control method 10.

When the engine encounters pre-determined operating conditions, the valve control method 10 goes from the all-cylinder activation mode and into the cylinder deactivation, mode. Skilled artisans will appreciate that the valve actuation phase centerlines could be positioned virtually anywhere along the overlap line 46 when the engine encounters the pre-determined operating conditions but usually are positioned within a range centered on the nominal operating domain 52, typically the intake actuation phase centerline is advanced past the nominal operating domain and the exhaust actuation phase centerline is retarded past the nominal operating domain.

When in the cylinder deactivation mode, and although not shown precisely on the graph of FIG. 3, the exemplary intake actuation phase centerline adjusts within about 20 crank angle degrees about the nominal operating domain 52. In particular, the intake actuation phase centerline advances between a range of about 0 to 10 crank angle degrees toward the fuel-economy operating domain 50, more suitably 0 to 6 degrees, and retards between a range of about 0 to 10 crank angle degrees toward the idle operating domain 48, more suitably 0 to 6 degrees. At the same time, the exemplary exhaust actuation phase centerline adjusts within about 24 crank angle degrees about the nominal operating domain 52. In particular, the exhaust actuation phase centerline retards between a range of about 0 to 12 crank angle degrees toward the fuel-economy operating domain 50, more suitably 0 to 6 degrees, and advances between a range of about 0 to 12 crank angle degrees, toward the idle operating domain 48, more suitably 0 to 6 degrees.

When the exemplary engine goes into the cylinder deactivation mode, the intake actuation phase centerline adjusts between a range of about 0 to 20 crank angle degrees, with respect to the fuel-economy operating domain 50, and more suitably 5 to 20 degrees. At the same time, the exhaust actuation phase centerline adjusts between a range of about 0 to 20 crank angle degrees, and more suitably 5 to 20 degrees.

As mentioned, the intake and exhaust centerlines can be positioned virtually anywhere along the overlap line 46 when the engine goes from the all-cylinder activation mode and into the cylinder deactivation mode. Whenever it does so, the intake actuation phase centerline retards between a range of about 0 to 20 crank angle degrees, more suitably 0 to 12 degrees. And, at the same time, the exhaust actuation phase centerline advances between a range of about 0 to 20 crank angle degrees, more suitably 0 to 12 degrees.

Skilled artisans will appreciate that the control method 10 may improve fuel economy because the overlap line 46 lies adjacent, and may even go through, the cylinder deactivation operating domain 54 which in turn lies adjacent the fuel-economy operating domain 50. That being so, the intake and exhaust centerline positions can more easily switch between the all-cylinder activation mode and the cylinder deactivation mode. Moreover, the control method 10 uses variable valve timing to augment cylinder deactivation in a similar sense by having the cylinder deactivation operating domain 54 in a range where the particular engine can be experiencing improved torque, thus allowing the engine to remain in the cylinder deactivation mode longer while still meeting the torque demanded of the engine. And some fuel economy benefits can be achieved, with the control method 10 when the cylinder deactivation mode ends because of the synergistic coupling of variable valve timing and cylinder deactivation that may be achieved in at least some embodiments of the present invention. In other words, the valve events in the cylinder deactivation mode are already coincident with the preferred valve event locations for best fuel economy in the all-cylinder activation mode.

If cams are used, such as in the embodiment of FIG. 2, the cams can be advantageously positioned to produce improved torque in the cylinder deactivation mode which permits combination of the fuel economy benefit of cylinder deactivation with the increased torque capability provided by variable valve timing which has its own fuel economy benefit when used in the all-cylinder activation mode. Further, one cam positioning strategy set forth herein places the preferred cam positions for improved torque relatively close to the cam positions for improved fuel economy. Because of this, the intake and exhaust cams can adjust over a relatively small range of crank angle degrees throughout the various engine operating modes. This permits efficient switching between the all-cylinder activation and cylinder deactivation engine operating modes.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

What is claimed is:

1. A method of controlling valves in an internal combustion engine for a vehicle in an all-cylinder activation mode of operation and a cylinder deactivation mode of operation, comprising:

utilizing a variable valve timing system to continuously adjust engine valves during all-cylinder activation mode operation and during cylinder deactivation mode operation for increasing cylinder volumetric efficiency and reducing engine-pumping loss, thus improving fuel economy and performance;

when in at least a portion of the all-cylinder activation mode of operation, selectively advancing each intake valve actuation phase at least about 8 crank angle degrees from a nominal operating domain comprised of a respective intake and exhaust valve centerline position setpoint for the internal combustion engine if it were lacking the variable valve timing system toward a fuel-economy operating domain comprised of a respective optimum intake and exhaust valve centerline position setpoint where there is improved fuel economy relative to any other of the intake and exhaust valve centerline positions for the internal combustion engine while the internal combustion engine is using variable valve timing during the all-cylinder activation mode of operation;

concurrently, when in at least a portion of the all-cylinder activation mode of operation, selectively retarding each exhaust valve actuation phase at least about 6 crank angle degrees from the nominal operating domain toward the fuel-economy operating domain;

transitioning from the all-cylinder activation mode of operation into the cylinder deactivation mode of operation when an intake valve centerline and an exhaust valve centerline are positioned within a range of centerlines centered on the nominal operating domain;

when in the cylinder deactivation mode of operation, selectively advancing each active intake valve actuation phase within a range of about 0-10 crank angle degrees, inclusive, from the nominal operating domain toward the fuel-economy operating domain, and selectively retarding each active intake valve actuation phase within a range of about 0-10 crank angle degrees, inclusive, from the nominal operating domain toward an idle operating domain comprised of a respective valve centerline position setpoint when the engine is idling; and concurrently, when in the cylinder deactivation mode of operation, selectively retarding each active exhaust valve actuation phase within a range of about 0-12 crank angle degrees, inclusive, from the nominal operating domain toward the fuel-economy domain, and selectively advancing each active exhaust valve actuation phase within a range of about 0-12 crank angle degrees, inclusive, from the nominal operating domain toward the idle operating domain.

2. The method of claim 1 wherein advancing each intake valve actuation phase in at least a portion of the all-cylinder activation mode of operation further comprises selectively advancing each intake valve actuation phase at least about 8 crank angle degrees from the nominal operating domain toward the fuel-economy operating domain.

3. The method of claim 2 wherein retarding each exhaust valve actuation phase in at least a portion of the all-cylinder activation mode of operation further comprises selectively retarding each exhaust valve actuation phase at least about 8 crank angle degrees from the nominal operating domain toward the fuel-economy operating domain.

4. The method of claim 3 wherein, when in the cylinder deactivation mode of operation, further comprising selectively advancing each active intake valve actuation phase within a range of about 0-6 crank angle degrees, inclusive, from the nominal operating domain toward the fuel-economy operating domain, and selectively retarding each active intake valve actuation phase within a range of about 0-6 crank angle degrees, inclusive, from the nominal operating domain toward the idle operating domain.

5. The method of claim 4 wherein, when in the cylinder deactivation mode of operation, further comprising selectively retarding each active exhaust valve actuation phase within a range of about 0-6 crank angle degrees, inclusive, from the nominal operating domain toward the fuel-economy operating domain, and selectively advancing each active exhaust valve actuation phase within a range of about 0-6 crank angle degrees, inclusive, from the nominal operating domain toward the idle operating domain.

6. A method of controlling valves in an internal combustion engine for a vehicle in an all-cylinder activation mode and a cylinder deactivation mode, comprising:

utilizing a variable valve timing system to continuously adjust engine valves though the all-cylinder activation mode and the cylinder deactivation mode for increasing cylinder volumetric efficiency and reducing engine-pumping loss, thus improving fuel economy and performance;

when in the all-cylinder activation mode, selectively advancing each intake valve actuation phase at least about 20 crank angle degrees from an idle operating domain toward a fuel-economy operating domain;

concurrently, when in the all-cylinder activation mode, selectively retarding each exhaust valve actuation phase at least about 20 crank angle degrees from the idle operating domain toward the fuel-economy operating domain;

transitioning from the all-cylinder activation mode into the cylinder deactivation mode when an intake valve centerline and an exhaust valve centerline of each intake valve and each exhaust valve are positioned within a range centered on a nominal operating domain, wherein the cylinder deactivation mode deactivates half of the cylinders of the engine when the vehicle encounters a predetermined operating condition during light-to-moderate load conditions when the vehicle is cruising;

controlling the flow of oil entering and exiting a hydraulic roller follower using an electro-hydraulic manifold assembly comprising at least one solenoid valve and an oil pressure assembly for controlling the valves in the cylinder deactivation mode;

when in the cylinder deactivation mode, selectively adjusting each active intake valve actuation phase within a range of about 0-20 crank angle degrees, inclusive, from the fuel-economy operating domain toward a cylinder deactivation operating domain;

concurrently, when in the cylinder deactivation mode, selectively adjusting each active exhaust valve actuation phase within a range of about 0-20 crank angle degrees, inclusive, from the fuel-economy operating domain toward the cylinder deactivation operating domain; and positioning an intake valve actuation centerline and an exhaust valve actuation centerline adjacent the cylinder deactivation operating domain which is adjacent to the fuel economy operating domain for allowing the intake valve actuation centerline and exhaust valve actuation centerline positions to switch between the all-cylinder activation mode and the cylinder deactivation mode.

7. The method of claim 6 wherein advancing each intake valve actuation phase further comprises selectively advancing each intake valve actuation phase about 30 crank angle degrees from the idle operating domain toward the fuel-economy operating domain.

8. The method of claim 7 wherein retarding each exhaust valve further comprises selectively retarding each exhaust valve actuation phase about 50 crank angle degrees from the idle operating domain toward the fuel-economy operating domain.

9. The method of claim 8 wherein adjusting each intake valve further comprises selectively adjusting each active intake valve actuation phase within a range of about 5-20 crank angle degrees, inclusive, from the fuel-economy operating domain toward the cylinder deactivation operating domain.

10. The method of claim 9 wherein adjusting each exhaust valve further comprises selectively adjusting each active exhaust valve actuation phase within a range of about 5-20 crank angle degrees, inclusive, from the fuel-economy operating domain toward the cylinder deactivation operating domain.

11. The method of claim 6 wherein, when in the all-cylinder activation mode, for every 1 unit of measurement that each intake valve actuation phase is advanced, each exhaust valve actuation phase is retarded by 1 unit of measurement such that an overlap angle of the valves remains substantially the same.

12. A method of using variable valve timing system to augment a cylinder deactivation mode in an internal combustion engine for a vehicle, comprising:

transitioning from the all-cylinder activation mode into the cylinder deactivation mode when an intake valve centerline and an exhaust valve centerline are positioned within a range centered on a nominal operation domain;

initiating the cylinder deactivation mode by deactivating half of the cylinders of the engine when the vehicle encounters a predetermined operating condition during light-to-moderate load conditions when the vehicle is cruising;

when going from an all-cylinder mode and into the cylinder deactivation mode, retarding each intake valve actuation phase within a range of about 0-20 crank angle degrees, inclusive;

concurrently, advancing each exhaust valve actuation phase within a range of about 0-20 crank angle degrees, inclusive; and controlling the flow of oil entering and exiting a hydraulic roller follower using an electro-hydraulic manifold assembly comprising at least one solenoid valve and an oil pressure assembly for controlling the valves in the cylinder deactivation mode.

13. The method of claim 12 wherein retarding each intake valve actuation phase further comprises retarding each intake valve actuation phase within a range of about 0-12 crank angle degrees, inclusive.

14. The method of claim 13 wherein advancing each exhaust valve actuation phase further comprises advancing each exhaust valve actuation phase within a range of about 0-12 crank angle degrees, inclusive.

15. The method of claim 1, further comprising a vane-type variable valve timing mechanism that is partly controlled by a solenoid type electromagnetic actuator, a hydraulic circuit with a pump for pumping oil in and out of the vane-type variable valve timing mechanism, and an ECU for controlling the solenoid type electromagnetic actuator.

16. The method of claim 1, further comprising, a hydraulic roller follower housing a valve deactivator assembly having a first end and a second end, wherein the first end is operatively connected to a cam located on a camshaft with a roller follower, and the second end is operatively connected to a rocker arm assembly that is operatively connected to a valve assembly comprising a valve and a spring.

17. The method of claim 5, further comprising a vane-type variable valve timing mechanism that is partly controlled by a solenoid type electromagnetic actuator, a hydraulic circuit with a pump for pumping oil in and out of the vane-type variable valve timing mechanism, and an ECU for controlling the solenoid type electromagnetic actuator.

18. The method of claim 6, further comprising, the hydraulic roller follower housing a valve deactivator assembly having a first end and a second end, wherein the first end is operatively connected to a cam located on a camshaft with a roller follower, and the second end is operatively connected to a rocker arm assembly that is operatively connected to a valve assembly comprising a valve and a spring.

19. The method of claim 6, further comprising positioning at least one cam for improved torque relatively close to a cam position for improved fuel economy for producing improved torque in the cylinder deactivation mode, resulting in improved fuel economy from the cylinder deactivation and increased torque.

20. The method of claim 12, further comprising positioning at least one cam for improved torque relatively close to a cam position for improved fuel economy and producing improved torque in the cylinder deactivation mode, resulting in improved fuel economy from the cylinder deactivation and increased torque.

* * * * *